No. 886,467. PATENTED MAY 5, 1908.
G. A. BADER.
SPRING BRIDGE.
APPLICATION FILED DEC. 26, 1907.
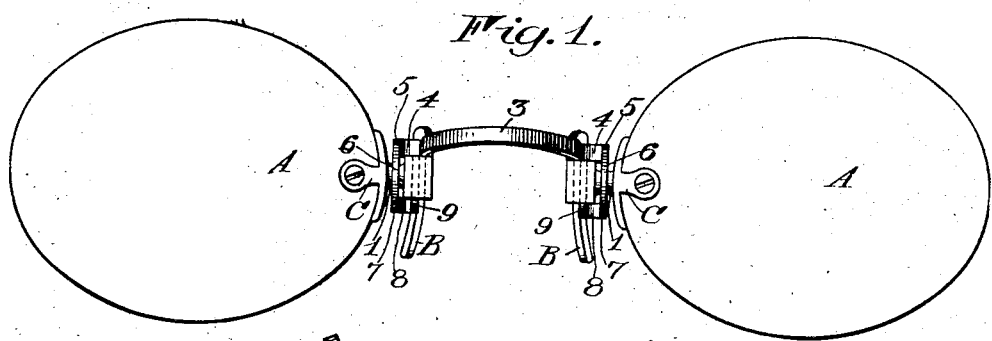
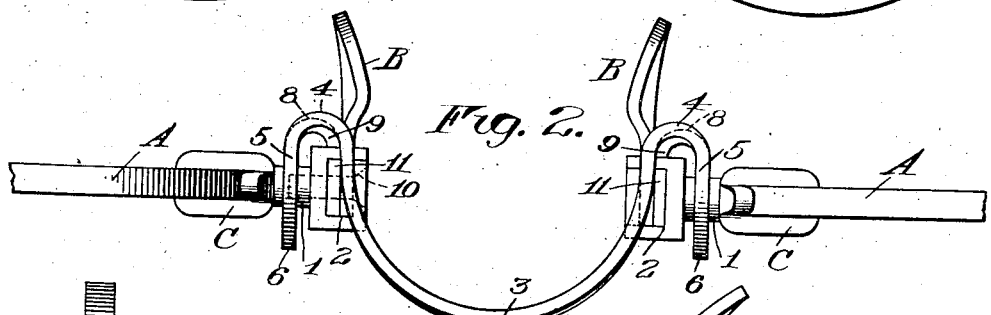
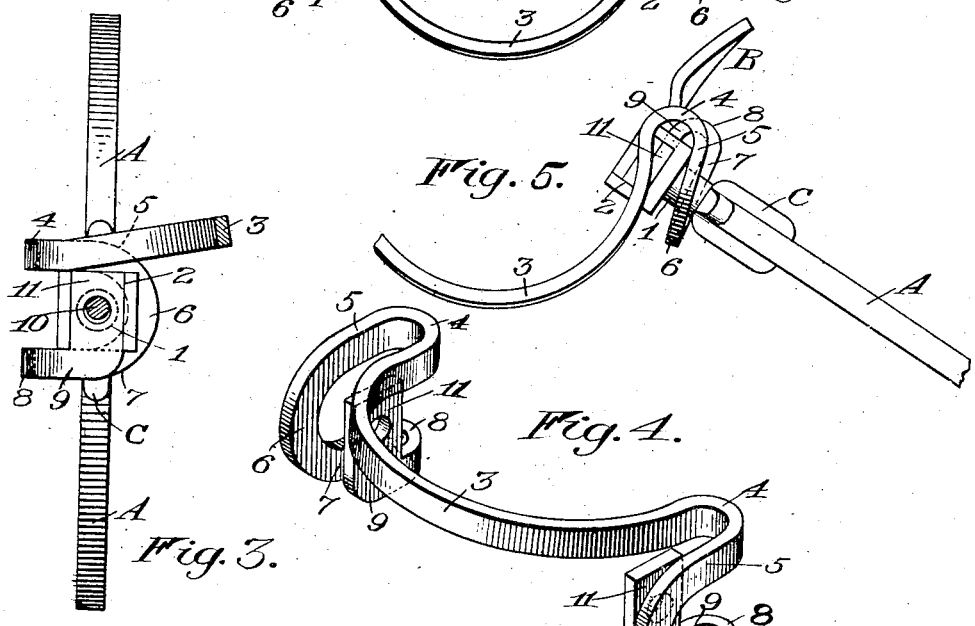
Witnesses
Walter B. Payne
H. H. Simms
Inventor
Gustav A. Bader
By Smith & Rich
His Attorneys

UNITED STATES PATENT OFFICE.

GUSTAV A. BADER, OF ROCHESTER, NEW YORK, ASSIGNOR TO E. KIRSTEIN SONS COMPANY, OF ROCHESTER, NEW YORK, A CORPORATION OF NEW YORK.

SPRING-BRIDGE.

No. 886,467.      Specification of Letters Patent.      Patented May 5, 1908.

Application filed December 26, 1907. Serial No. 408,076.

*To all whom it may concern:*

Be it known that I, GUSTAV A. BADER, of Rochester, in the county of Monroe and State of New York, have invented certain new and useful Improvements in Spring-Bridges; and I do hereby declare the following to be a full, clear, and exact description of the same, reference being had to the accompanying drawings, forming a part of the specification, and to the reference-numerals marked thereon.

The present invention relates to eyeglasses of the type in which the lenses move in the plane of vision to operate the nose guards, and has for an object to provide an improved construction in which the bridge has more resiliency and at the same time will permit of an adjustment for the pupilary distance without affecting the operation of the guards.

To these and other ends the invention consists in certain improvements and combinations of parts all as will be hereinafter more fully described, the novel features being pointed out in the claims at the end of the specification.

In the drawings: Figure 1 represents an enlarged front view of a pair of eyeglasses constructed in accordance with this invention; Fig. 2 represents a top view of the eyeglasses; Fig. 3 a central transverse section through the eyeglasses; and Fig. 4 represents a perspective view of the bridge; and Fig. 5 represents one of the lenses moved to separate the guards.

Similar reference numerals in the several figures indicate similar parts.

In the embodiment of the invention herein shown A indicates the glasses or lenses, B the nose guards and C the lens attaching devices, all of these parts being of any suitable construction, but it is preferred that the lens attaching devices have the posts 1 and the vertically arranged seats 2 at their inner ends.

The spring bridge is formed near each end with two horizontal loops arranged one over the other, and preferably opening forwardly, for by this arrangement, when the lenses are moved to separate the nose guards the upper loop is closed and the lower loop is opened, thus causing one to act on the other and prevent either from weakening. For the purpose of rendering the loops inconspicuous and at the same time of giving greater length to the arm which connects a pair, one of each pair is arranged above the lens attaching device, while the other is arranged below.

In a preferred embodiment the bridge is formed from a piece of flat stock having uniform width if desired, the stock being bent widthwise between its ends to form the bridging portion 3, outwardly at 4 and forwardly at 5 to form the upper horizontal loops. From each upper horizontal loop a bend downwardly edgewise of the stock provides a vertical portion 6 which connects the upper loop to the lower loop formed in the present instance by bending the stock again edgewise of the stock and rearwardly at 7 to a point vertically below the bend 5, thence inwardly at 8 and thence forwardly at 9, this forwardly extending portion of the lower loop being provided with an attaching arm 11 which projects upwardly toward the upper loop, and is secured in a vertical seat 2 by a fastener 10 which secures a nose guard B. Each vertical portion 6 with the arms of the upper and the lower loop secured thereto forms a loop about the proximate post and when the lenses are moved to a certain distance to separate the guards the connection 6 engages the proximate lens attaching device in the manner shown in Fig. 4, and prevents the lower loop spreading too far.

While, of course, I am not to be limited to making the bridge of flat stock, yet this has special advantages when bent in the manner described, as the widthwise bends give greater resiliency in the horizontal direction and rigidity in a vertical direction, and the edgewise loops which pass about the lens attaching devices are not conspicuous when viewed from the front, in side view also being inconspicuous, owing to the fact that they snugly hug the reduced posts 1.

The horizontal arrangement of the loops one above and one below the lens attaching device permits the use of a bridge of greater length with a decreased amount visible from the front and the greater length of the bridge, in addition to giving greater resiliency, gives greater adjustment between the lenses for changing the pupilary distance of the eyeglasses.

I claim as my invention:

1. The combination with a pair of lenses, of a spring bridge connecting them, having a bridging portion and a pair of forwardly opening loops, at each end of the bridging portion in vertical planes beyond the bridging portion.

2. The combination with a pair of lenses, of a spring bridge connecting them having a bridging portion and a pair of forwardly opening loops arranged at each end of the bridging portion, one over the other, in vertical planes beyond said bridging portion.

3. A spring bridge having a bridging portion and a pair of forwardly opening horizontal loops at each end, arranged in vertical planes beyond the bridging portion.

4. A spring bridge having a bridging portion and a pair of forwardly opening horizontal loops at each end one arranged above the other, in vertical planes beyond the bridging portion.

5. The combination with a pair of lens attaching devices, of a spring bridge connecting them having horizontal loops arranged over and beneath the lens attaching devices.

6. The combination with a pair of lens attaching devices, of a spring bridge connecting them having a pair of forwardly opening horizontal loops at each end, one arranged over and the other arranged beneath the proximate lens attaching device.

7. A spring bridge having a bridging portion, and at each end an outward bend, a forward bend, a downward bend, a rearward bend, an inward bend and a forward bend.

8. A spring bridge for eyeglasses formed from flat stock and comprising a bridging portion and two horizontal loops arranged one above the other, formed by widthwise bends and connected by edgewise bends in the stock.

9. A spring bridge for eyeglasses formed from flat stock and comprising a bridging portion and two forwardly opening loops arranged one over the other, formed by widthwise bends in the stock and connected by edgewise bends.

10. The combination with the lens attaching devices, of a spring bridge formed from flat stock and comprising a bridging portion, a horizontal loop arranged at each end of the bridging portion above the proximate lens attaching device and formed by widthwise bends of the stock, and a horizontal loop formed by widthwise bends of the stock, arranged below each lens attaching device and connected to an upper loop by edgewise bends.

11. The combination with the lens attaching devices, of a spring bridge formed with horizontal loops arranged beneath the lens attaching devices and loops passing about the lens attaching devices.

12. The combination with the lens attaching devices having vertical seats, of a spring bridge having a pair of forwardly opening horizontal loops at each end of its bridging portion, one arranged above and the other below each lens attaching device, and an attaching arm projecting upwardly from the inner arm of each lower loop and secured within a vertical seat.

GUSTAV A. BADER.

Witnesses:
HAROLD H. SIMMS,
RUSSELL B. GRIFFITH.